United States Patent [19]

Mathie

[11] Patent Number: 4,654,955
[45] Date of Patent: Apr. 7, 1987

[54] TOOL CHANGER MECHANISM FOR MACHINING CENTERS

[75] Inventor: Gerald W. Mathie, Holly, Mich.

[73] Assignee: The Valeron Corporation, Troy, Mich.

[21] Appl. No.: 524,405

[22] PCT Filed: Sep. 7, 1982

[86] PCT No.: PCT/US82/01216
§ 371 Date: Aug. 12, 1983
§ 102(e) Date: Aug. 12, 1983

[87] PCT Pub. No.: WO84/00915
PCT Pub. Date: Mar. 15, 1984

[51] Int. Cl.⁴ ..................... B23Q 3/155; B23Q 3/157
[52] U.S. Cl. ..................... 29/568; 82/36 B;
279/48; 414/226; 414/590; 414/735; 414/736
[58] Field of Search ............... 29/568; 82/36 A, 36 B;
279/48; 414/225, 226, 589, 590, 591, 735, 736;
294/97, 106

[56] References Cited

U.S. PATENT DOCUMENTS

| | | | |
|---|---|---|---|
| 1,886,224 | 11/1932 | Redinger | 279/48 |
| 3,628,404 | 12/1971 | Riley | 82/36 A X |
| 3,667,114 | 6/1972 | Smith et al. | 29/568 |
| 4,055,095 | 10/1977 | Gramespacher et al. | 29/568 X |

*Primary Examiner*—Z. R. Bilinsky
*Attorney, Agent, or Firm*—Lloyd M. Forster

[57] ABSTRACT

The disclosure relates to a tool changing mechanism comprising an arm with hands at each end thereof having means to pick up both boring and turning tools. The arm is actuated by hydraulic rotary actuators and the tools are gripped by air operated fingers. A turret assembly is equipped with a boring tool holder and a turning tool holder for the acceptance of tools changed by the changing mechanism.

A magazine holds replacement boring bars and turning tools until a tool change is required. An automatic tool lock-unlock mechanism is provided to lock the tools in cutting position.

16 Claims, 8 Drawing Figures

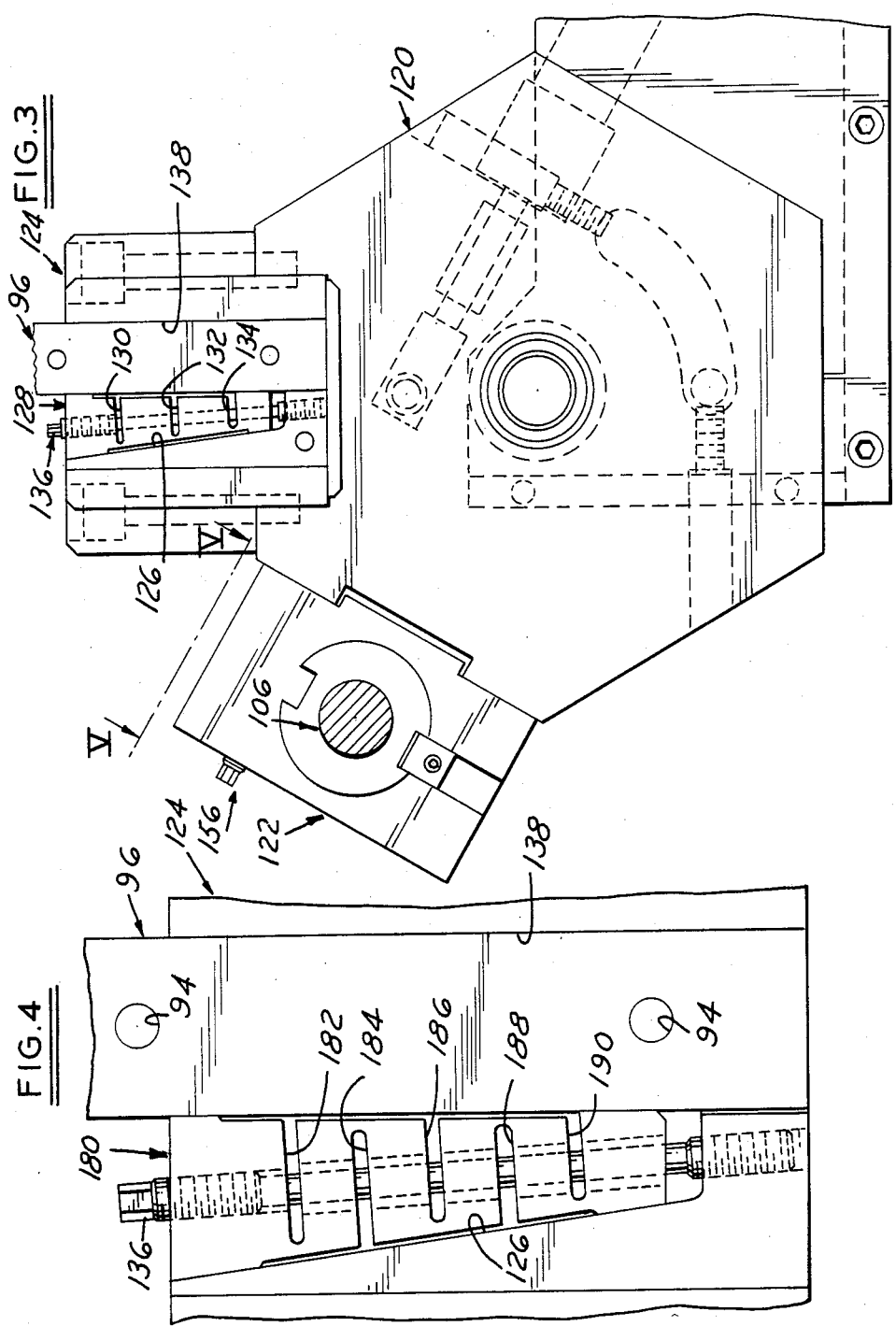

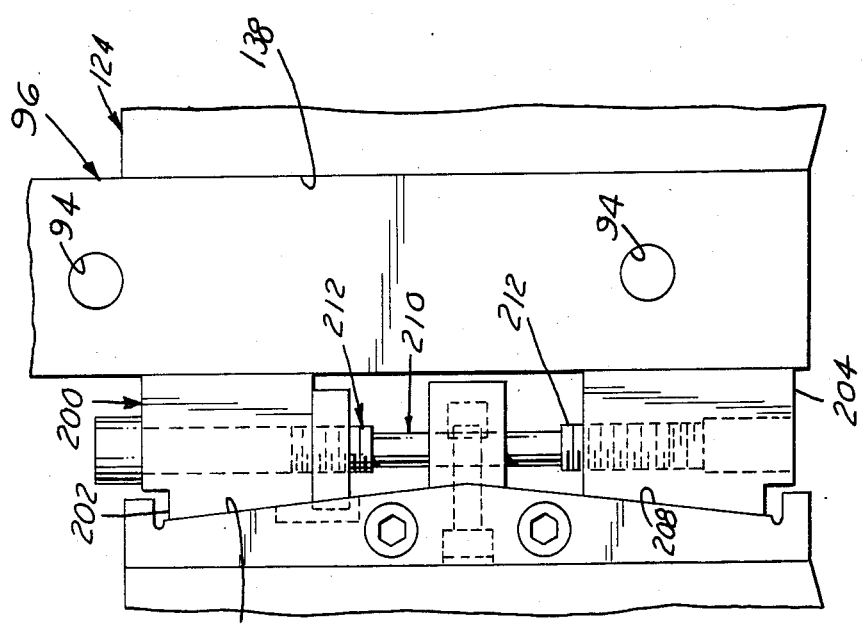
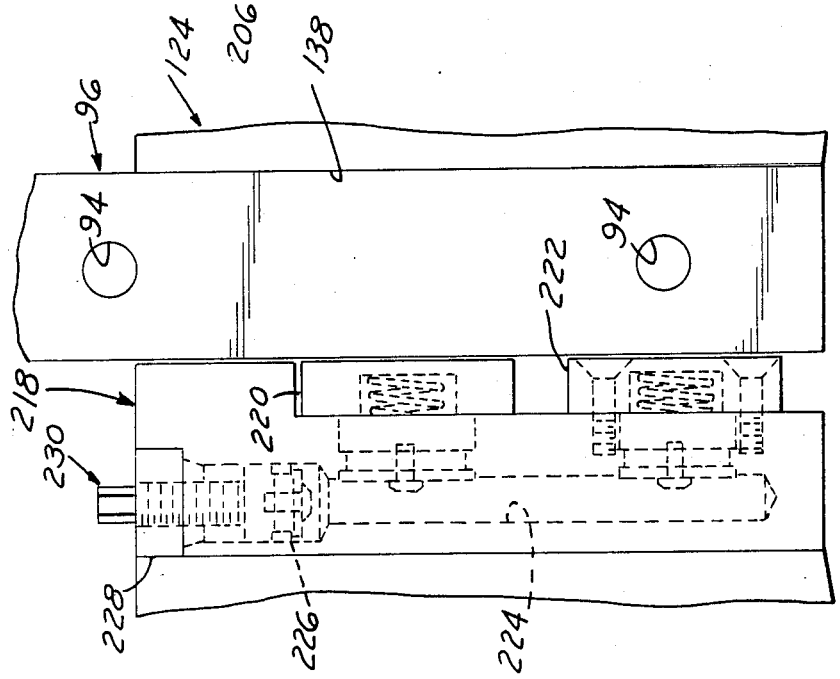

TOOL CHANGER MECHANISM FOR MACHINING CENTERS

BACKGROUND OF THE INVENTION

Machining centers utilizing tool changer mechanisms can contribute significantly to improved flexibility and reduced non-cutting time in machining operations. Standardization of tool shanks and holders, as well as the use of modular tooling, interchangeable tool inserts, and uniform pallet sizes are the prerequisites. Both tooling and machine tool manufacturers are putting great effort into development of new systems designed to meet users requirements.

Machine centers are a relatively new development made possible by the versatility of numerically controlled machine tools, in particular the numerically controll lathe. However, tooling costs can account for a sizable portion of the total investment required to place a machining center in production. Typical tooling costs average 15–20% of the cost of the machining center. Thus, when several different machine tools are utilized in a production facility, minimization of the number of different tools becomes desirable and, for unattended production, mechanized tool handling becomes imperative. Stated in another manner, while tool standardization is welcome, optimum cutting performance mandates the use of specialized tool handling mechanisms that meet specific user requirements.

Numerically controlled turning has led to the grouping of several operations, thereby requiring the use of turrets with a multiplicity of tools. However, replacing worn tools or cutting inserts still materially adds to non-cutting time loss and is a primary obstacle to the utilization of unmanned machining centers. Therefore, a standarized tool system with hydraulically actuated tool change and storage thereof in a magazine which can be replenished at an operator's convenience is required to maximize the duration of unattended operation of the machine.

SUMMARY OF THE INVENTION

A tool changer in accordance with the instant invention is designed to change A.N.S.I. standard tools with minor alterations. Alterations made to the tools do not affect use thereof in non-tool changer type applications. By using standard but altered tools instead of custom designed, single source tools, the tool changer enables the tooling to be purchased from any desired supplier. In addition, present in-house tools can be modified to fit tool changer machine centers.

The turning tools used on the tool changer of the instant invention are provided with two drilled and chamfered holes to accept the tool changer fingers. Boring tools used on the tool changer have a standard "ez-on" form on the shank end of the tool for easy entry into the boring bar holder and are provided with a pre-settable collar having a standard "V" flange form.

A constructed embodiment of the invention changes 1½" diameter shank boring bars and 1¼" square turning tools. The constructed tool changer is hydraulic and air operated and is controlled by a programmable logic controller.

More specifically, the tool changer of the instant invention comprises a horizontally and vertically movable slide with a rotatable arm thereon. The arm has a wrist and a hand at each end with fingers and grippers to pick up both boring and turning tools. Finger roll, wrist roll, and arm index movements are actuated by hydraulic rotary actuators. The finger gripping action is air operated. A 10" hex turret assembly is equipped with one boring bar holder and one turning tool holder. A hydraulic cylinder positions the turret thereby to position the proper tool holder as required for tool change.

A tool magazine holds a replacement boring bar and a turning tool, a hydraulic cylinder positioning the proper tool when a tool change is made.

An automatic tool lock-unlock mechanism consists of two air driven nutrunner torque motors mounted on guide rails and delivered to position by a hydraulic cylinder. Each torque motor is set to provide the proper locking torque for both types of tools. Several types of locking mechanisms are utilized for clamping the turning and boring tools.

BRIEF DESCRIPTION OF THE DRAWINGS

FIG. 3 is a view taken substantially along the line III—III of FIG. 1.

FIG. 4 is an enlarged fragmentary view of a turning tool lock.

FIG. 7 is a fragmentary view of another embodiment of a turning tool lock.

FIG. 8 is a fragmentary view of yet another embodiment of a turning tool lock.

DETAILED DESCRIPTION OF THE PREFERRED EMBODIMENT OF THE INVENTION

Figure 1:
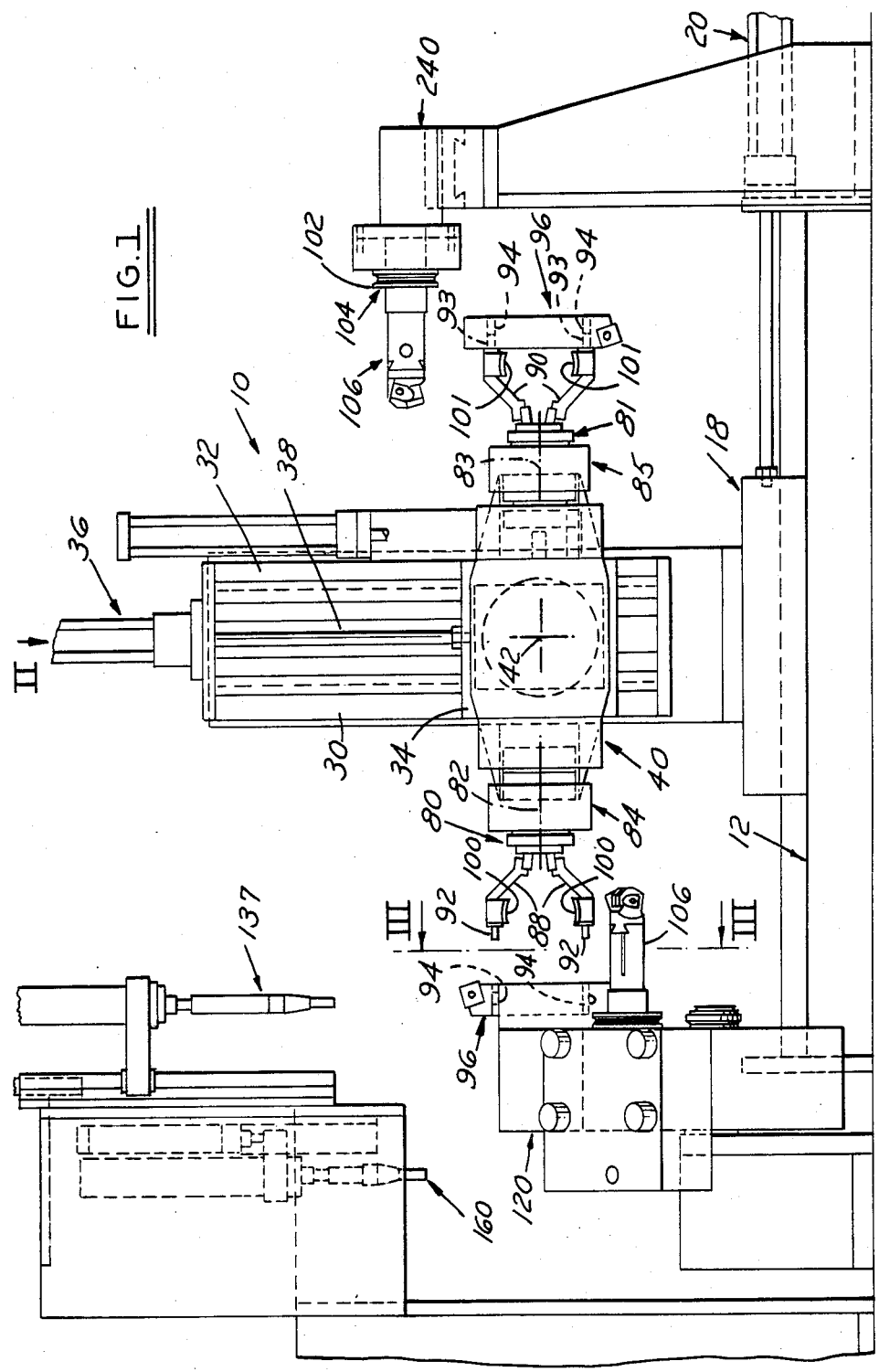
FIG. 1 is a front elevational view of a tool changer mechanism in accordance with an exemplary constructed embodiment of the instant invention.

As best seen in FIG. 1 of the drawings, a tool change mechanism 10 is of a type suitable for use in association with a conventional machining center, for example, a horizontal turning center (not shown). The tool changer mechanism 10 comprises a bed 12 having ways 14 and 16 thereon for the support of a horizontally movable slide 18. The slide 18 is controlled by a hydraulic cylinder 20 through a piston rod 22 which is connected to the slide 18. The slide 18 carries upstanding ways 30 and 32 for the support of a vertically movable arm slide 34. The arm slide 34 is controlled by a hydraulic cylinder 36 having a piston rod 38 connected to the slide 34.

Figure 2:
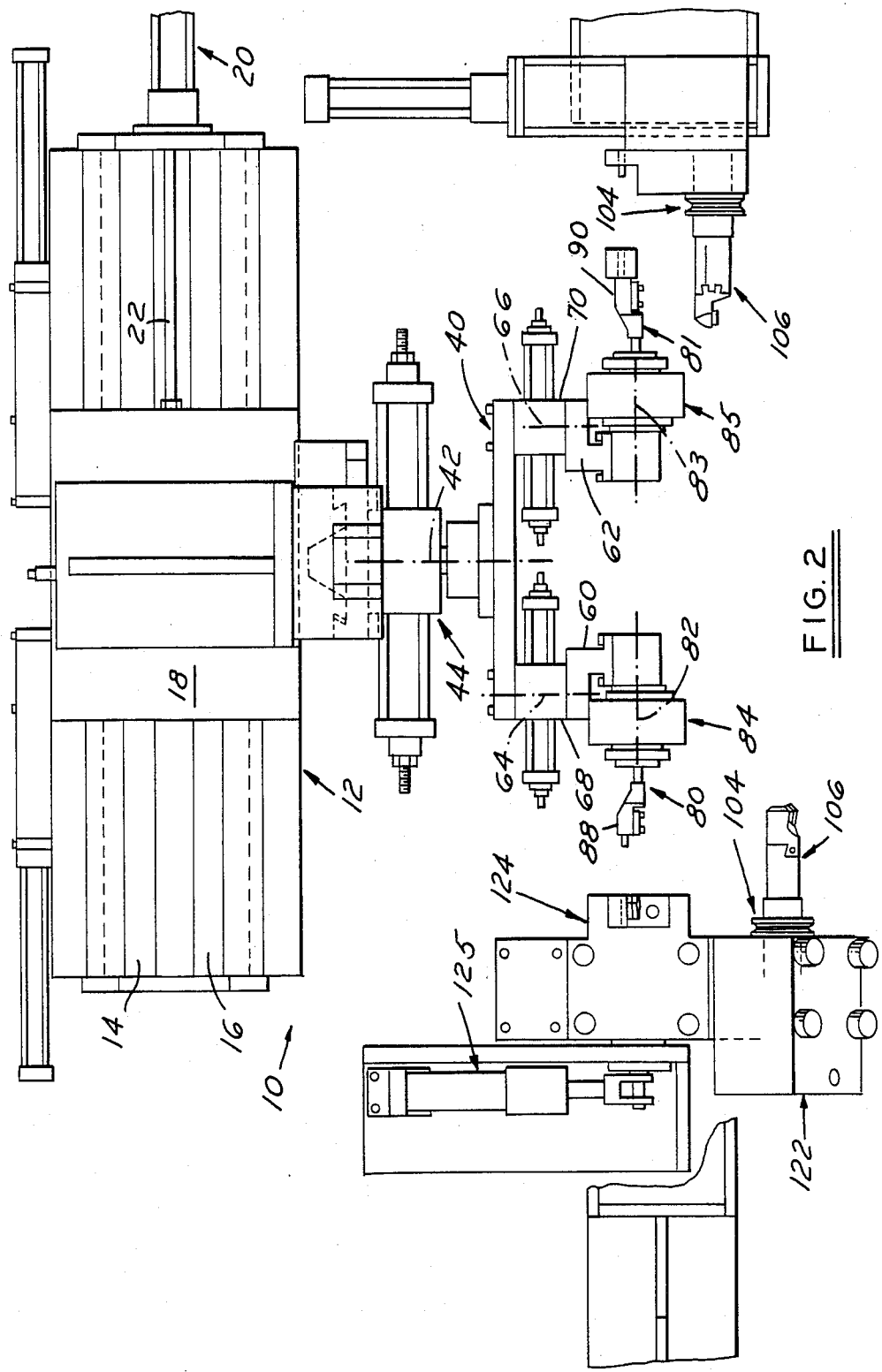
FIG. 2 is a view taken in the direction of the arrow II of FIG. 1.

As best seen in FIG. 2, rotatable tool changer arm 40 is journaled for rotation about a horizontal axis 42 by a hydraulic rotary actuator 44. The arm 40 is rotatable through an arc of 180° to effect changing of a tool, as will be described.

The arm 40 is provided with wrists 60 and 62 that are rotatable about axes 64 and 66, respectively, relative to the arm 40. The wrists 60 and 62 are journaled for rotation controlled by hydraulic rotary actuators 68 and 70, respectively. The wrists 60 and 62 are rotatable through an arc of 90°, to effect one movement in the tool changing sequence, to be described.

A pair of hands 80 and 81 are rotatable about axes 82 and 83 relative to the wrists 60 and 62, under the control of rotary actuators 84 and 85, respectively. The hands 81 and 82 are provided with sets of fingers 88 and 90, respectively, which are adapted to positively grip a tool, as will be described.

As best seen in FIG. 1 of the drawings, the pairs of fingers 88 and 90 are each provided with pins 92 and 93 that are acceptable in complementary apertures 94 in a tool 96 (see FIG. 4) to effect gripping thereof for purposes of tool change.

Figure 5:
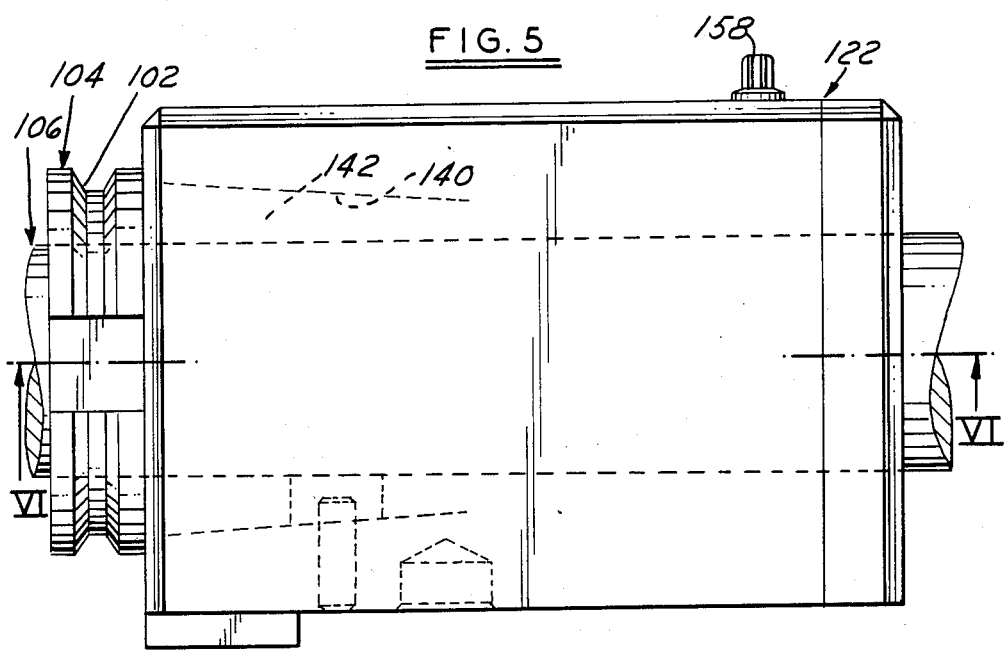
FIG. 5 is a view taken substantially along the line V—V of FIG. 3.

In addition, the fingers 88 and 90 are provided with pairs of collar gripping jaws 100 and 101, respectively, each of which is of V-shaped arcuate section that is acceptable within a complementary V-shaped groove 102 in a collar 104 (see FIG. 5). The collar 104 is attachable to a standard boring bar 106 to condition the bar 106 for handling by the tool changer 10.

As best seen in FIG. 3 of the drawing, a turret 120 is provided with a boring bar holder 122 and a cutting tool holder 124. The turret 120, in the disclosed exemplary constructed embodiment, is indexable through arcs of 60° by a hydraulic cylinder 125 (see FIG. 2), to effect positioning of either the tool 96 or the tool 106 at a cutting station.

The tool holder 124 has a V-shaped recess 126 for the acceptance of a wedge 128. The wedge 128 is provided with lateral slits 130, 132 and 134 to effect bowing and locking thereof against the tool 96 upon rotation of a locking screw 136 by a powered driver 137. Advancement of the wedge 128 effects locking of the tool 96 against a face 138 of the holder 124.

Figure 6:
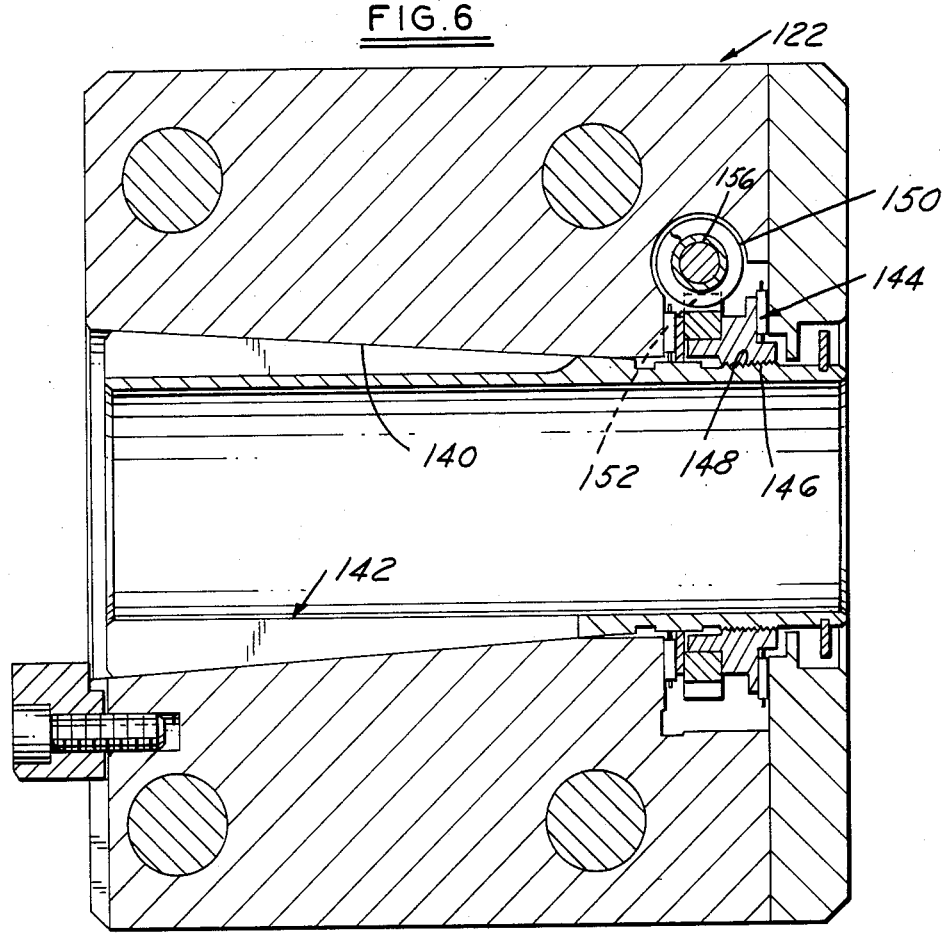
FIG. 6 is a view taken substantially along the line VI—VI of FIG. 5.

As best seen in FIGS. 5 and 6 of the drawings, the boring bar holder 122 has a conical recess 140 for the acceptance of a conical split collar 142. The collar 142 has an external taper complementary to the taper of the recess 140 in the holder 122. The conical collar 142 is advanceable in the recess 140 upon rotation of a nut 144 having threads 146 that are complementary to threads 148 on the collar 142. Rotation of the nut 144 is affected by a worm 150 that is meshed with complementary teeth 152 on the nut 144. The worm 150 is mounted on a shaft 156 having a drive head 158 for engagement by a powered driver 160. Rotation of the shaft 156 affects rotation of the worm 150 which in turn affects rotation of the nut 144 and advancement or retraction of the conical collar 142 relative to the boring bar tool holder 122.

As seen in FIG. 4 of the drawings, a modified wedge 180 is usuable to effect locking of the tool 96 in the tool holder 124. The wedge 180 is provided with lateral slits 182, 184, 186, 188 and 190 that extend from opposite directions to enhance flexibility and compression of the wedge 180 against the angularly related side portion 126 of the holder 124 and the tool 96. As with the wedge 128, the wedge 180 baises the tool 96 against the side face 138 of the tool holder 124.

As seen in FIG. 7 of the drawings, a modified wedge 200 effects locking of the tool 96 in the tool holder 124. The wedge 200 comprises a pair of wedge blocks 202 and 204 that are drawn toward one another up oppositely directed slopes 206 and 208, respectively, to effect wedging of the tool 96 against the edge face 138 of the tool holder 124. Movement of the wedge blocks 202 and 204 toward and away from each other is effected by a screw 210.

As best seen in FIG. 8 of the drawings, yet another wedge mechanism 218 for effecting locking of the tool 96 in the tool holder 124 comprises a pair of hydraulically actuated pistons 220 and 222. The pistons are actuated by hydraulic fluid that is pressurized in a manifold 224 by a piston 226. The piston 226 is advanced or retracted relative to a threaded nut 228 by rotation of a screw 230. The screw 230 is rotated by the complementary driver 137. Pressurization of the fluid within the manifold 224 effects advancement of the pistons 220 and 222 against the tool 96 to bias the tool 96 against the edge face 138 of the tool holder 124.

In operation, as seen in FIG. 1 of the drawings, the tool changer mechanism 10 has picked up a tool 96 from a tool magazine 240, the pins 93 on the fingers 90 having been accepted in the complementary apertures 94 in the tool 96. It is to be noted that the pairs of fingers 88 and 90 are spread apart and pulled together by a pneumatic actuator disposed internally of the hands 80 and 82 thereby to effect gripping or release of the tool 96.

Assuming that the tool 96 mounted in the turret 120 is to be removed and the like tool 96 in the fingers 90 is to be exchanged therefor, the slide 18 is first advanced to the left, as seen in FIG. 1 of the drawings, by energization of the hydraulic cylinder 20. The slide 18 moves the arm 40 to the left, the pins 92 being accepted in the complementary apertures 94 in the tool 96. Thereafter, the power screwdriver 137 moves downwardly to effect rotation of the screw 136 which retracts the wedge 128 upwardly freeing the tool 96 for withdrawal from the tool holder 124.

After the tool 96 is free from the tool holder 124 on the hexagonal turret 120, the slide 118 is returned to the position shown in FIG. 1. Thereafter, the arm 40 is rotated 180° bringing the replacement tool 96 into alignment with the tool holder 124 in the turret 120. Mounting of the new tool 96 in the tool holder 124 is accomplished by moving the slide 18.

The turning tools are provided with two drilled and chamfered holes to accept the tool changer fingers. The boring tools are provided with a presettable collar having a "V" section in the radial flange thereof.

In summary, the tool changer 10 is hydraulically and air operated and controlled by, for example, a Texas Instrument programmable logic controller. The changer comprises horizontally and vertically movable slides, and an arm with a hand at each end with fingers and grippers to pick up both boring and turning tools. The finger roll, wrist roll, and arm index movements are actuated by hydraulic rotary actuators and the finger gripping action is air operated. A hex turret assembly is equipped with one boring bar holder and one turning tool holder. A hydraulic cylinder positions the turret and proper holder as required for tool change. A magazine holds a replacement boring bar and a turning tool, a hydraulic cylinder positioning the proper tool when a tool change is made. The automatic tool lock-unlock mechanism consists of two air driven nutrunner torque motors mounted on guide rails and delivered to position by a hydraulic cylinder. Each torque motor is set to provide the proper locking torque for both types of tools. Several types of locking mechanisms are utilized for clamping both the turning and boring tools.

While the preferred embodiment of the invention has been disclosed, it should be appreciated that the invention is susceptible of modification without departing from the scope of the following claims.

I claim:

1. A tool changer for a machining center comprising means for storing a tool,
means for supporting a tool in cutting position,
a slide movable toward and away from said storing and cutting positions, and an arm on said slide rotatable about an axis equally spaced between the tool engaging means thereon and which extends at a right angle to the direction of movement of said slide, and tool engaging means attached at each end of said arm by a wrist rotatable about an axis parallel to the axis of rotation of said arm for removing and replacing tools at both said storing and cutting positions.

2. A tool changer in accordance with claim 1 including means for moving the axis of rotation of said arm at a right angle to the direction of movement of said slide.

3. A tool changer in accordance with claim 1 wherein said tool engaging means are attached to said wrists by hands rotatable about axes parallel to the axis of movement of said slide.

4. A tool changer in accordance with claim 3 wherein said tool engaging means are supported on arcuate fingers on said hands.

5. A tool changer in accordance with claim 3 wherein said tool engaging means comprises a pair of spaced pins.

6. A tool changer in accordance with claim 5 including a tool having spaced parallel bores in one face thereof for the acceptance of said pins.

7. A tool changer in accordance with claim 3 wherein said tool engaging means comprises a pair of spaced arcuate segments of V-shaped cross section.

8. A tool changer in accordance with claim 7 including a tool having a circular shank with a radial collar thereon, said collar having a V-groove on its periphery for the acceptance of said arcuate segments.

9. A tool changer in accordance with claim 1 wherein said tool supporting means comprises a tool holder having a V-shaped recess therein, and a V-shaped wedge in said recess engageable with said tool.

10. A tool changer in accordance with claim 1 wherein said tool supporting means comprises a tool holder having a cylindrical recess therein, means for locking a tool in said recess comprising a conical wedge, rotatable means for advancing and retracting said conical wedge, and power means for effecting rotation of said rotatable means.

11. A tool changer in accordance with claim 1 wherein said tool supporting means comprises a tool holder having a recess therein for the acceptance of square shank tools, and means in said recess engageable with said tool for locking thereof.

12. A tool changer in accordance with claim 11 wherein said locking means comprises a wedge that is advanceable by a screw, and a power driven screwdriver for rotating said screw.

13. A tool changer in accordance with claim 12 wherein said wedge has a plurality of lateral slits therein to facilitate compression against said tool.

14. A tool changer in accordance with claim 13 wherein said slits extend from opposite sides of said wedge.

15. A tool changer in accordance with claim 12 wherein said locking means comprises a pair of wedges that are advanceable toward one another to effect locking of a tool.

16. A tool changer in accordance with claim 12 wherein said locking means comprises a pair of hydraulic cylinders having locking pistons thereon, a piston for pressurizing a fluid to effect movement of said locking pistons, and screw means for effecting movement of said pressurizing piston.

* * * * *